(12) United States Patent
Ray et al.

(10) Patent No.: US 6,447,166 B1
(45) Date of Patent: Sep. 10, 2002

(54) LINEAR BUSHING

(75) Inventors: William Dwinal Ray, Macomb, MI (US); Christopher Michael Pangallo, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/577,811

(22) Filed: May 24, 2000

(51) Int. Cl.[7] .............................................. F16C 29/02
(52) U.S. Cl. .............................. 384/10; 384/37; 384/38
(58) Field of Search .............................. 384/10, 37, 26, 384/41, 38

(56) References Cited

U.S. PATENT DOCUMENTS

| 2,424,757 A | 7/1947 | Klumpp, Jr. |
| 2,664,458 A | 12/1953 | Rapata |
| 4,874,276 A | 10/1989 | Iguchi |
| 5,476,350 A | 12/1995 | Kurtz et al. |
| 5,664,888 A | 9/1997 | Sabin |
| 5,733,046 A | 3/1998 | Bellmore et al. |

Primary Examiner—Lenard A. Footland
(74) Attorney, Agent, or Firm—Pitney, Hardin, Kipp & Szuch LLP

(57) ABSTRACT

A linear bushing attachable to a structural member is formed of a tubular body having a tail part and a lead part forward of said tail part, the tubular body defining a cylindrical wall about a central longitudinal axis and having inner and outer surfaces. First and second sets of resiliently bendable arms extend respectively from the lead part and from the tail part, the arms of each set being spaced apart circumferentially and extending generally forwardly and radially inwardly. The arms of each set have distal ends with inner surfaces which define a bore of first diameter, these arms of each set being deflectable radially outward to define between the inner surfaces of their distal ends a bore of greater diameter than the first diameter. Each of these arms when deflected radially outward applies a resilient opposite radially inward force. The bushing further includes attachment elements on the outer surface of the tubular body for attaching the tubular body to a structural member, with the first and second sets of arms being spaced apart axially forward and rearward respectively of the attachment means.

17 Claims, 8 Drawing Sheets

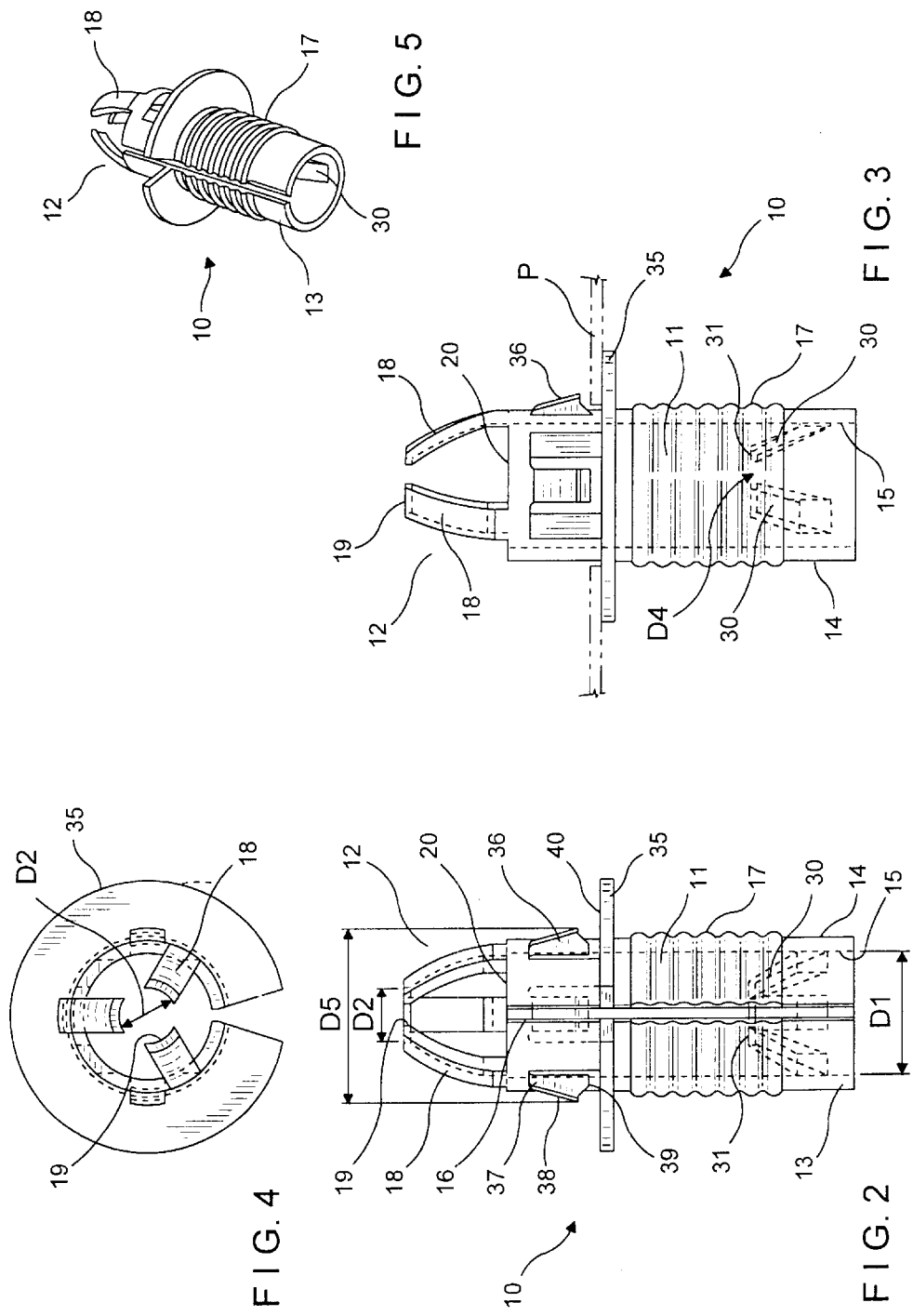

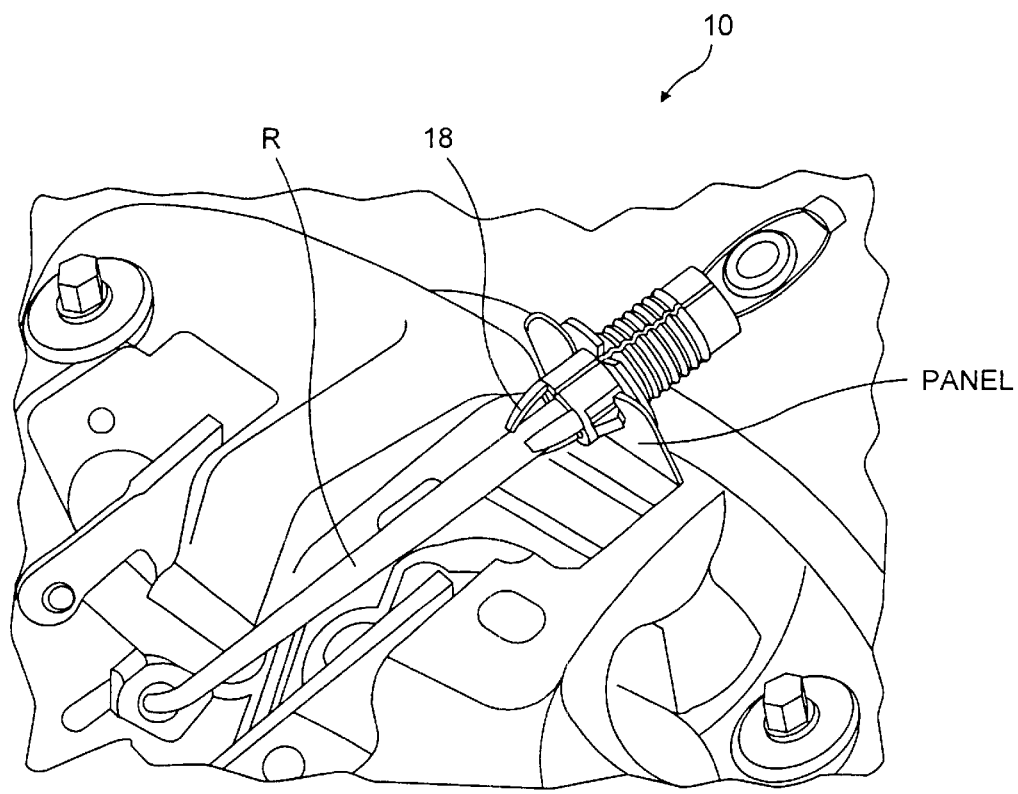
F I G. 7

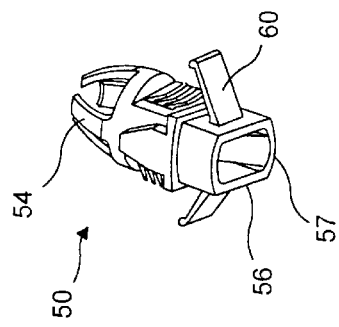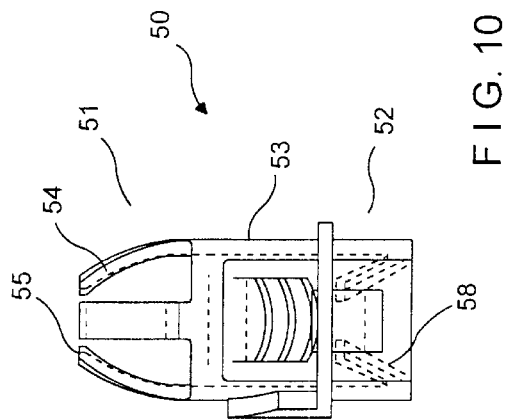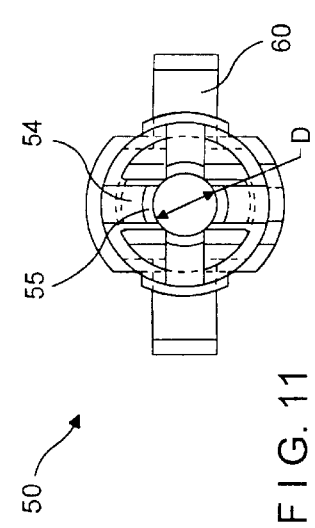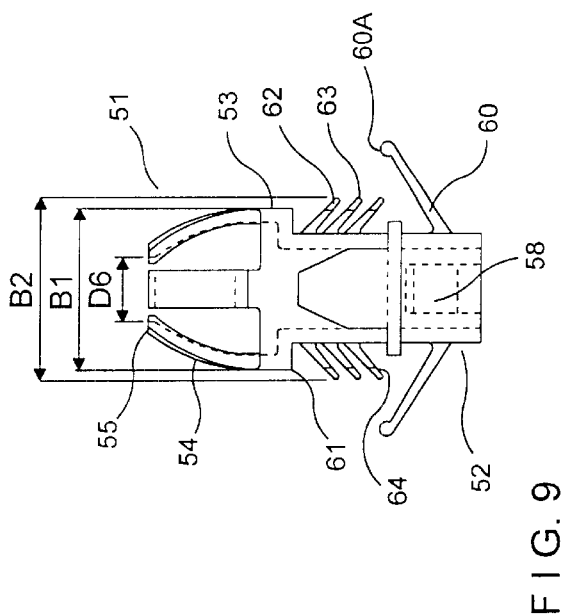
FIG. 12
FIG. 10
FIG. 11
FIG. 9

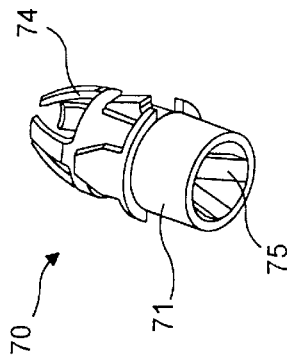
FIG. 16
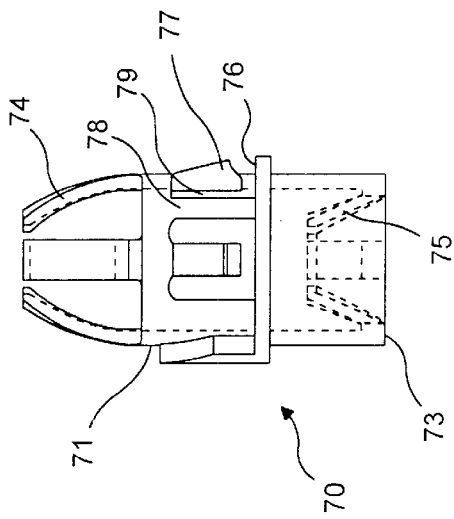
FIG. 14
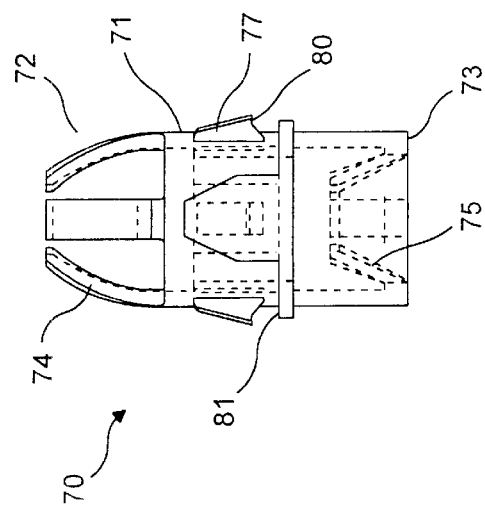
FIG. 15
FIG. 13

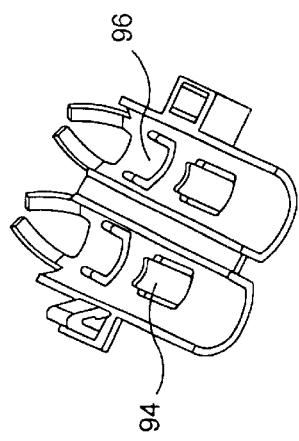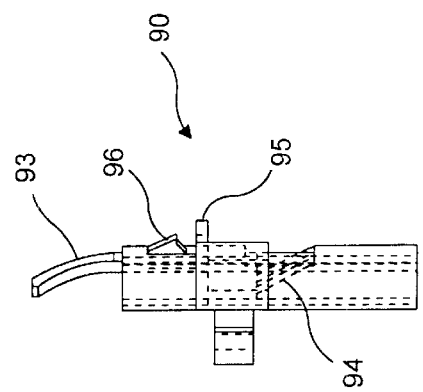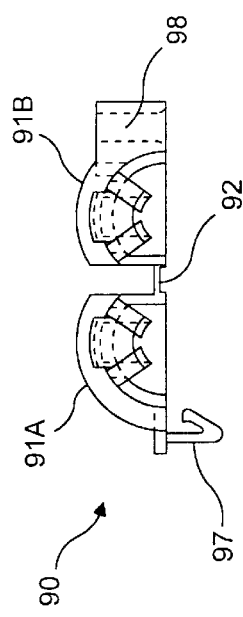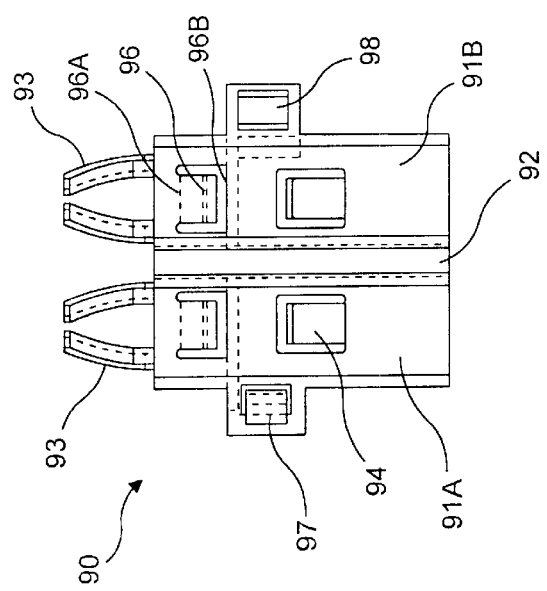

LINEAR BUSHING

BACKGROUND OF THE INVENTION

1. Field of the Invention

The invention is in the field of linear bushings which are mounted to a panel or other structural element, where each such linear bushing has a central bore in which a rod or bolt is situated and may be axially slidable.

2. Description of the Prior Art

A linear bushing is used to provide a slidable connection between two structural members, where, typically, the first member is a panel and the second member is a rod or bolt. For the discussion that follows the term "rod" will be used to include a rod, bolt or other element that is positionable within the bore of the bushing. The bushing is to maintain such rod in proper relative position and orientation while it moves axially and/or while it is axially stationary. To insure such freedom of movement merely requires a sliding or clearance fit; however, for mass-produced bushings and rods inserted therein, it is quite possible for the fit to be too loose due to manufacturing tolerance stack-ups, namely the combined dimensional variations in the rod diameter, in the bore diameter of the bushing, and in the panel hole diameter in which the bushing is secured. Typically, a tolerance stack-up results in a fit so loose that the rod will rattle within the bushing, which might occur while the rod is moving axially or while it is axially still. Such rattling is worsened when the rod is subjected to lateral, tilting and/or vibration forces and when the dimensional stack-up increases due to wear.

Some prior art bushings or grommets include a set of flexible arms which extend from a wall of the bushing to engage and press radially inward on the rod situated within such arms. These arms sometimes are initially compressed radially inward when the bushing is inserted into the aperture of a panel, and subsequently they expand to define a diameter less than the outside diameter of the rod. Thus, these arms will bear inwardly against the rod at a specific axial location at one end or the other of the bushing; however, the portion of the loose-fitting rod not engaged by the flexible arms will still be able to tilt or rattle. A variety of prior art bushings and grommets may be seen in U.S. Pat. Nos. 2,424,757, 2,664,458, 5,733,046, 5,664,888, 5,476,350 and 4,874,276, none of which provides a structure as disclosed herein.

OBJECTS AND SUMMARY OF THE INVENTION

The present invention is a new linear bushing structure that greatly reduces or eliminates any excess looseness of the rod within the bushing bore by applying inward radial force via two sets of flexible arms located respectively both above and below the panel. These arms are in constant contact with the rod whether it is stationary or moving axially and whether it is aligned coaxially with the bushing or tilted, and even when the rod is urged and moved laterally. At all times at least one flexible arm above and one flexible arm below the panel is resiliently bearing against the rod and thus preventing it from rattling. In actual use of the new linear bushing the rod is usually engaged at all times by two or more of these flexible arms above the panel and by two or more of these arms below the panel.

Accordingly, even if there is a tolerance stack-up due to excess bore diameter of the bushing and/or excess bore diameter of the panel aperture and/or reduced outside diameter of the rod, the flexible arms will always contact and apply appropriate force above and below the panel to stabilize the rod within the bushing.

It is thus an object of this invention to provide a linear bushing that compensates for tolerance stack-up and assures a good sliding fit with a rod in all conditions normally encountered.

It is a further object to provide a linear bushing that is simple and economical to manufacture, and simple and reliable to use.

By utilizing this new structure to compensate for variations in critical dimensions of the respective components, it is now possible to have mass production of these bushings without highly expensive manufacturing equipment otherwise required to maintain very close tolerances. Thus, the new invention permits great economy of manufacture while still producing a simple and reliable product that is also better in use than known prior art linear bushings.

The new linear bearing has a tubular body having a lead end for insertion into an aperture in a panel or other structural element and an opposite tail end. This tubular body is formed by a cylindrical wall having an inner surface which defines a bore about a central axis and an outer surface. There is a first set of flexible arms extending from the lead end axially in the lead-end direction and radially inwardly, with the terminal ends of these arms defining a bore diameter that is smaller than the diameter of the rod to be inserted into the bushing. These arms are spaced apart circumferentially, but are otherwise similar in dimensions and shape. Non-uniform arms might be used in specific situations.

The new bearing further includes a second set of flexible arms extending from the bore surface of the bushing axially in the lead-end direction and radially inwardly. The terminal ends of these arms also define a bore diameter that is smaller than the outer diameter of the rod to be inserted therein. These upper and lower sets of arms are flexible, but strong and resilient so as to constantly apply a stabilizing force on the rod regardless of whether it is moving, stationery, tilted or urged laterally.

Finally, there are panel mounting elements for attaching the bushing to a panel or other structural member, these elements typically comprising one fixed element extending transversely outward from the tubular body, and axially spaced therefrom one or more movable resilient elements also extending transversely outward. In the first embodiment shown herein the fixed element is a radially outwardly extending disc or other form of lateral projection from the outer surface of the cylindrical body and situated axially between said upper and lower sets of flexible arms. Cooperating with such fixed element are projections or tabs which are either flexible and resilient or are attached to a flexile and resilient portion of the tubular body. The fixed element and flexible elements are axially spaced apart a distance generally corresponding to the thickness of the panel on which the bushing is to be mounted.

In use, this bushing is inserted lead-end first through the aperture in the panel. The tabs deflect inward to allow the lead part to pass through the aperture until the panel mounting element bars further axial motion of the bushing. The bushing then becomes locked onto the panel, barred by the tabs and the fixed element from further axial movement. The sets of flexible arms are situated above and below the panel, and a rod, when inserted or otherwise positioned within the bore of the bushing, is "captured" by the sets of flexible arms, which assure a snug sliding fit and significant reduction of tolerance stack-up, resultant rattling or other defective operation.

Numerous variations in the structure of the new linear bushing are possible as shown in the drawings appended hereto and as described in the detailed description of same as follows.

BRIEF DESCRIPTION OF THE DRAWINGS

FIG. 2 is a front elevation view thereof.

FIG. 3 is a right side elevation view thereof.

FIG. 4 is a top plan view of FIG. 2.

FIG. 5 is a bottom, front and side perspective view thereof.

FIG. 7 is similar to FIG. 6 but shows a top, front and left side perspective view thereof.

FIG. 9 is a front elevation view thereof.

FIG. 10 is a right side elevation view thereof.

FIG. 11 is a top plan view of FIG. 9.

FIG. 12 is a bottom and front and right side perspective view thereof.

FIG. 13 is a front elevation view of a third embodiment of the new linear bushing.

FIG. 14 is a right side elevation view thereof.

FIG. 15 is a top plan view of FIG. 13.

FIG. 16 is a bottom, front and right side perspective view thereof.

FIG. 17 is a front elevation view of a fourth embodiment of the new linear bushing shown in unassembled condition.

FIG. 18 is a left side elevation view thereof.

FIG. 19 is a top plan view of FIG. 17.

FIG. 20 is a bottom perspective view of the linear bushing of FIGS. 17–19 showing the inside surfaces of the two halves of the bushing.

DESCRIPTION OF THE PREFERRED EMBODIMENTS

Figure 1:
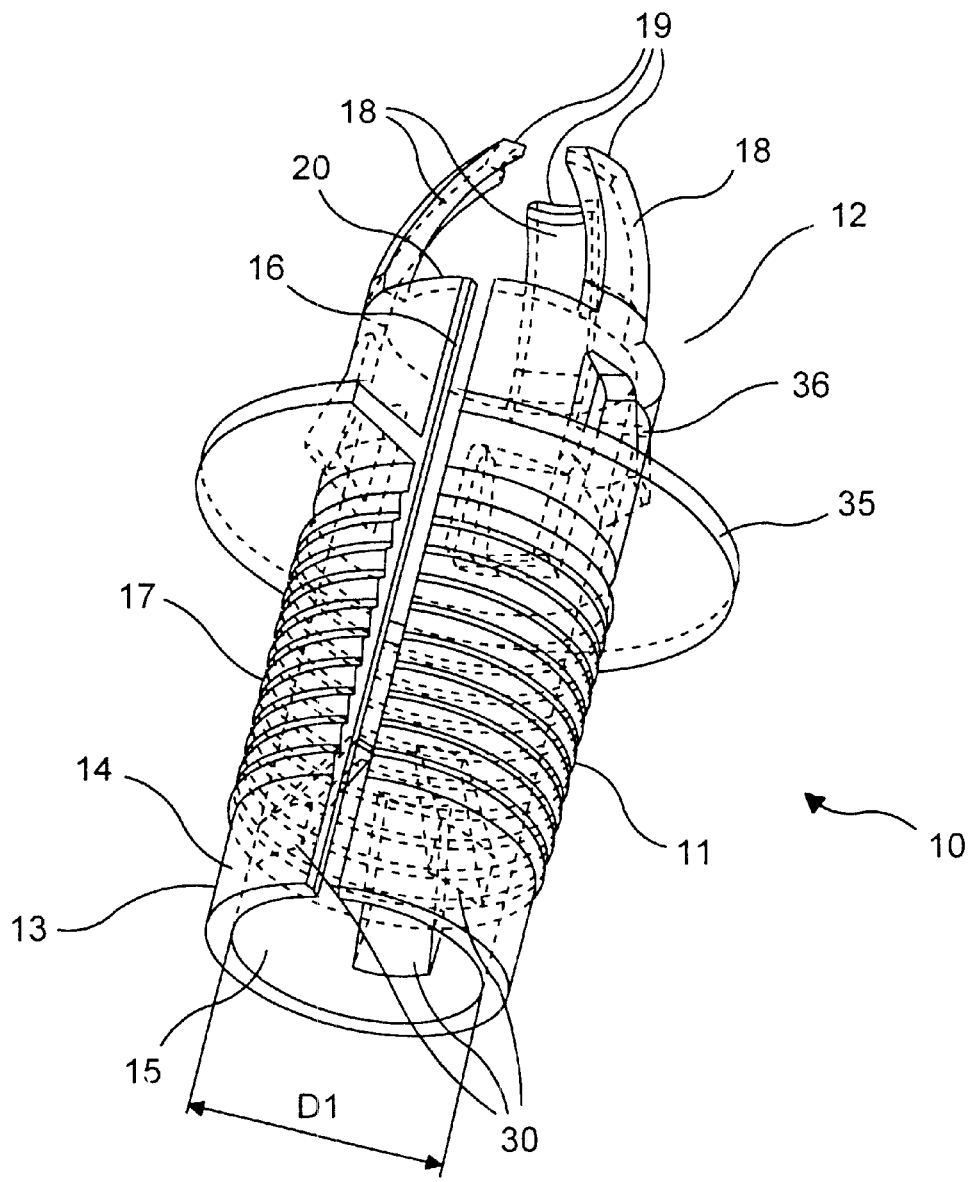
FIG. 1 is a front, bottom perspective view of a first embodiment of the new linear bushing of our new invention, drawn for enhanced clarity as if it were made of transparent material.

The drawings show four embodiments of the new linear bushing, the first in FIGS. 1–7, the second in FIGS. 8–12, the third in FIGS. 13–16, and the fourth in FIGS. 17–20.

The first embodiment has a body 11 formed as a cylindrical tube, with a lead part 12 and a tail part 13. The wall of this cylindrical tube has outer surface 14 and inner surface 15 defining a bore D1 therethrough. A slit 16 extends through the cylindrical wall and along the length thereof. Circumferential ribs 17 extend radially outward which provide both added strength and decoration. If desired the tubular body could have a rectangular or other non-circular shape.

At the lead part 12 is a first set of resilient arms 18 which are circumferentially spaced equally and which are curved to extend axially and inwardly with their tips 19 defining a bore diameter D2 which is selected to be less than the outer diameter D3 of a rod to be axially inserted therethrough. These arms are contiguous with and extend from the lead edge 20 of the lead part 12 of the body 11. FIGS. 1–4 show these arms to have essentially the same thickness as the wall of body 11; however, they may be formed thinner than said wall to thereby be more flexible. As seen, the arms define bore D2 of 5.0 mm to receive a rod of diameter 6.0 mm. The body part including all the arms is injection molded CELCON TX 90 per WSF-M4D618-A plastic. These arms 18 are flexible and resilient so that when a rod of diameter D3 is inserted axially through their bore D2, one or more of these arms will flex radially outward and then exert a radially inward force, urging the encompassed rod to remain snugly engaged to all the arms. Thus, one or more arms will apply a resilient force against the rod whether it is moving axially or stationary, whether it is vibrating or moved laterally, or tilted. The amount of pressure on the rod may be adjusted by adjusting arms 18.

The linear bushing of FIGS. 1–7 has a second set of resilient arms 30 seen best in FIGS. 1–4. These arms extend from the inner wall surface 15 forward and radially inward with their tips 31 defining a bore D4 generally the same as diameter D2 defined by the tips 19 of the first set of resilient arms 18. Arms 30 depend from and are contiguous with the inner surface 15 of the wall of body 11, and they are flexible and resilient and exert an inward force when flexed outward by insertion of a rod, as with the first set of arms. If desired additional sets of arms may also be provided.

Thus, tips 31, similarly as tips 19 of the first set of. arms, constantly engage the rod regardless of whether the rod is axially moving or not, or vibrating, or moved laterally or tilted.

When a rod is used with a linear bushing of this type it is not uncommon for the rod to be subjected to an external force which tilts the rod and/or urges it laterally in the vicinity of only the first set of arms or the vicinity of only the second set of arms, or at both vicinities. With both sets of arms constantly engaging the rod regardless of whether it is axially or laterally moving or is tilting or is stationary, this linear bushing assures a constant and continuous snug engagement to prevent rattling or other excessive or undesirable movement of the rod.

Axially between the first set of arms at the lead part of this bushing and the second set of arms at the tail part, is a panel mounting arrangement which includes a shoulder 35 and tabs 36. Each tab has a lead edge 37, a tapered edge 38 and a rear edge 39. The shoulder 35 has an panel-engaging surface 40.

As seen in FIG. 2, these tabs define an outer diameter D5 (about 15.6 mm) intended to be inserted into a panel aperture of about 13.48 mm diameter of a panel about 1.3–1.5 mm thick. The distance between the tail end 39 of a tab 36 and the panel-engaging surface 40 corresponds to the thickness of the panel to be engaged. FIG. 3 shows a fragmentary section of a panel P situated and secured between tabs 36 and shoulder 35.

These tabs may be considered as a third set of arms; however, there is no need for them to be flexible or resilient as said first and second set of arms, because the entire cylindrical body can flex radially inward by the thickness of said slit 16 when this bushing is urged axially into a hole of a panel. After insertion, the cylindrical body immediately expands to its normal diameter, whereby it remains snugly engaged in the panel aperture, both axially and laterally.

Figure 6:
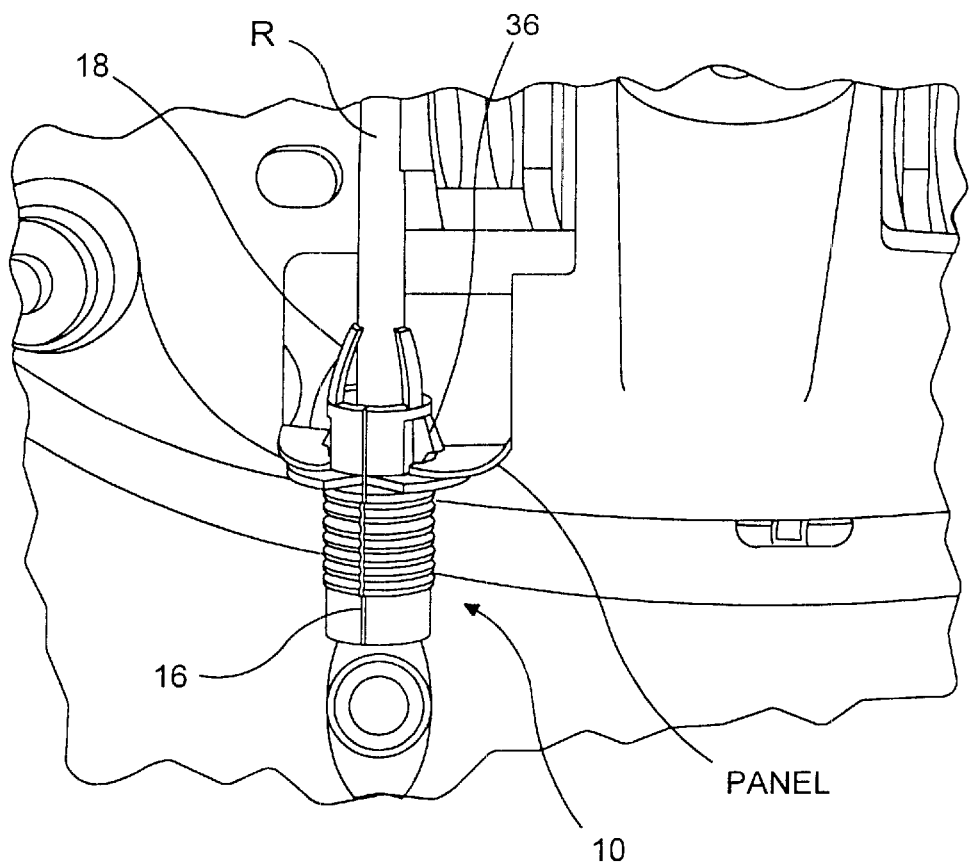
FIG. 6 is a front elevation view thereof, further showing a rod extending through the linear bushing which is mounted to a panel.
Figure 8:
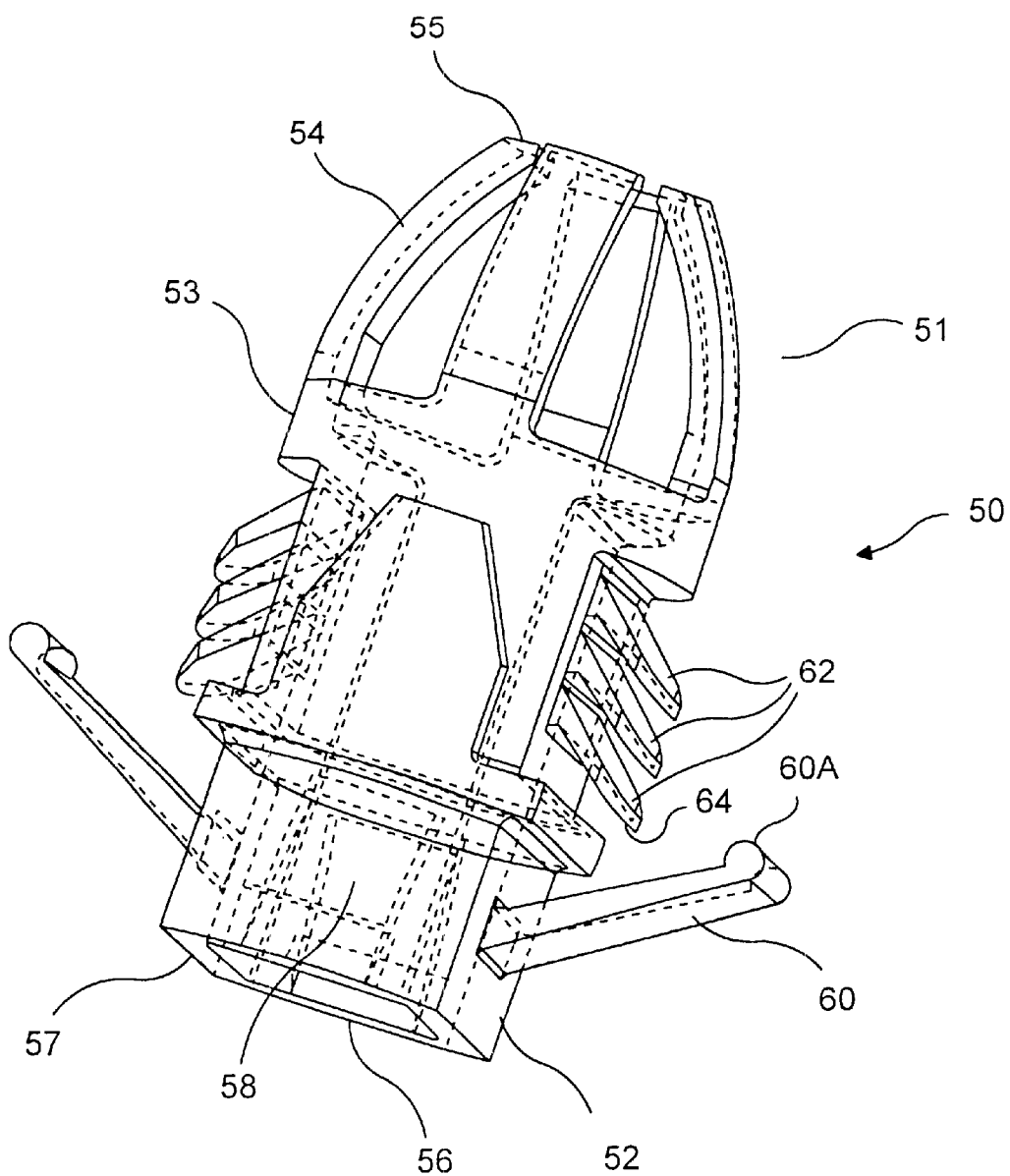
FIG. 8 is a bottom, front and right side perspective view of a second embodiment of the new linear bushing, drawn for enhanced clarity as if it were made of transparent material.

FIGS. 6 and 7 illustrate this bushing with a rod R of a door handle linkage extending therethrough. As seen, the first set of arms 18 are resiliently encompassing the rod in a snug slidable coupling. These FIGS. 6 and 7 demonstrate how the panel shoulder 35 and tabs 36 capture between them the edge or portion 41 of a panel.

FIGS. 8–12 illustrate a second embodiment 50 of the new linear bushing with lead part 51 and tail part 52 of the body 53. The first set of resilient arms 54 terminates in tips 55 which define between them bore D6 of 5.0 mm. The body 53 is generally rectangular with parallel sides 56 and convex curved ends 57 for insertion of an appropriately shaped aperture in a panel.

At the tail part of this bushing is a second set of resilient arms 58 which extend radially inward and forward, similarly as the second set of arms in the above-described first embodiment. However, in place of the panel shoulder of the first embodiment, the second embodiment has a pair of arms 60 extending outward and forward from the end walls of the tail part, these arms being resiliently flexible in the lead part direction, as described below. When this bushing is inserted in a panel aperture with the lead part 51 first, the body part 61 (see FIG. 9) has breadth B1 less than that of the panel aperture, while the flexible tabs 62 have breadth B2 greater than said aperture.

Thus, tabs 62 deflect until the edges of the aperture pass the tips 63 of tabs 62. Arms 60 are deflected downward with the tips 64 of the last tab pressing downward on the panel while the tops 60A of arms 60 press upward. Obviously, the distance between tops 60A of these arms is greater than the opening of the panel aperture. The flexibility of tabs 62 makes insertion of this linear bushing possible into a panel aperture without needing a full length axial slit in the tubular body as in the first embodiment.

FIGS. 13–16 illustrate a third embodiment 70 of a linear bushing generally similar to the first embodiment, in that it has a cylindrical body 71 with a lead part 72 and a tail part 73. At the lead part is a first set of resilient arms 74, and at the tail part is the second set of resilient arms 75. Between these sets of arms is a panel engaging shoulder 76 and a pair of tabs 77. Between each tab 77 and wall 78 of the body 71 is an axial space 79 which is a clearance space into which tab 77 can deflect radially inward during insertion of this bushing into a panel aperture. Thus, this is another variation of body part for a bushing that does not require a full length slit down the length of the body as used in the first embodiment described above. As before, a panel is captured between the tail edge 80 of tab 77 and the top surface 81 of the panel shoulder.

The fourth embodiment 90 seen in FIGS. 17–20 is formed as a pair of half-cylinders 91A, 91B, joined along their length in a bendable hinge 92. Each half has a pair of resilient arms 93 at the lead part and a pair of resilient arms 94 at the tail part, all the arms extending in the lead direction and inward, similarly as in the prior embodiments. The bushing also has a panel-engaging shoulder 95 and tabs 96, generally similar to those of the first and third embodiments. In use the two halves are folded about hinge 92 to form a generally semi-circular cylindrical body where spring latch 97 enters and catches in aperture 98.

The lugs 96 as seen in FIGS. 17 and 20 extend from the body only by their top edges 96A, as there is a gap 96B or slit along their side and bottom edge. Thus, these lugs 96 are bendable inwardly about said top edge 96A to allow the lead part of the bushing to enter a panel aperture until it bottoms against shoulder 95.

While the invention has been described in connection with preferred embodiments, those skilled in the art will recognize possible variations in structure and materials which can be used in the practice of the invention. The invention is therefore intended to be limited only by the scope of the claim appended hereto.

What is claimed is:

1. A linear bushing attachable to a structural member, comprising
   a. a tubular body having a tail part and a lead-part forward of said tail part, said tubular body defining a cylindrical wall about a central longitudinal axis and having inner and outer surfaces,
   b. first and second sets of resiliently bendable arms extending respectively from said lead part and from said tail part, the arms of each set spaced apart circumferentially and extending generally forwardly and radially inwardly, said arms of each set having distal ends with inner surfaces which define a bore of first diameter, said arms of each set being deflectable radially outward to define between said inner surfaces of their distal ends a bore of greater diameter than said first diameter, each of said arms when deflected radially outward applying a resilient opposite radially inward force, and
   c. attachment means on said outer surface of said tubular body for attaching said tubular body to said structural member, said first and second sets of arms being spaced apart axially forward and rearward respectively of said attachment means.

2. A linear bushing according to claim 1 wherein said first and second sets of arms each comprises three equally spaced arms having generally the same dimensions and shape.

3. A linear bushing according to claim 1 wherein said tubular body defines a generally round cylinder having a generally circular lead edge, and said first set of arms extends from said lead edge.

4. A linear bushing according to claim 1 wherein said tubular body defines a generally round circular cylinder, and said second set of arms extends from said inner surface of said tail part.

5. A linear bushing according to claim 3 wherein said second set of arms extends from said inner surface of said tail part.

6. A linear bushing according to claim 1 wherein said attachment means comprises a shoulder extending transversely outward from said outer surface, and axially spaced from said shoulder in the forward direction at least one projection extending from said outer surface radially outward establishing a normal outer diameter at its axial position on said tubular body, said at least one projection being resiliently deflectable radially inward to temporarily establish an outer diameter of smaller dimension than said normal outer diameter at said axial position.

7. A linear bushing according to claim 6 wherein said attachment means comprises at least two of said projections circumferentially spaced from each other.

8. A linear bushing according to claim 6 wherein each of said projections is resiliently bendable with respect to said cylindrical wall.

9. A linear bushing according to claim 6 wherein said tubular body has an axial slit through its thickness from said inner to outer surfaces and along its entire length, thereby defining a pair of spaced apart adjacent edges, said cylindrical wall being resiliently deflectable radially inwardly to close said slit and thereby temporarily reduce the outer diameter of said tubular body at the axial position of said at least one projection.

10. A linear bushing according to claim 6 wherein said shoulder comprises a disc extending generally perpendicularly from said outer surface.

11. A linear bushing according to claim 6 wherein said shoulder comprises at least two arm-like projections on opposite sides of said body extending outward and downward and having distal ends defining a diameter greater than that of said body.

12. A linear bushing according to claim 1 wherein said first set of arms are curved, defining a bullet-shaped lead end.

13. A linear bushing according to claim 1 wherein said tubular body is generally rectangular in cross-section, defining a pair of opposite end walls and a pair of opposite side walls, and said attachment means comprises flexible and resilient tabs extending outward respectfully from one of said pairs of opposite walls.

14. A linear bushing according to claim 13 wherein said at least one projection of said attachment means comprises a set of three axially spaced flexible and resilient strips on each of two opposite sides of said body.

15. A linear bushing according to claim 1 wherein said tubular body and said first and second sets of arms and said attachment means comprise a contiguous injection molded article of a single plastic.

16. A linear bushing according to claim 1 wherein each of said arms comprises an elongated strip.

17. A linear bushing attachable to a structural member, comprising a. a tubular body having a tail part and a lead part forward of said tail part, said tubular body defining a cylindrical wall about a central longitudinal axis and having inner and outer surfaces, b. first and second sets of resiliently bendable arms extending respectively from said lead part and from said tail part, each of said arms having a proximal end joined to said tubular body and a distal end with an inner surface, said distal ends of each of said sets of arms being mutually closer together than said proximal ends thereof, the arms of each set spaced apart circumferentially and extending generally forwardly and radially inwardly, said distal ends of said arms of each set being deflectable radially outward to enlarge the distance between their inner surfaces, each of said arms when deflected radially outward applying a resilient opposite radially inward force, and c. attachment means on said outer surface of said tubular body for attaching said tubular body to said structural member, said first and second sets of arms being spaced apart axially forward and rearward respectively of said attachment means.

* * * * *